US012595819B2

(12) United States Patent
Just et al.

(10) Patent No.: US 12,595,819 B2
(45) Date of Patent: Apr. 7, 2026

(54) HINGE SYSTEM WITH ADJUSTABLE RESISTANCE

(71) Applicant: MADAD PTY LTD, Wacol (AU)

(72) Inventors: Morrison Just, Wacol (AU); Daniel Green, Wacol (AU)

(73) Assignee: MADAD PTY LTD, Wacol (AU)

( * ) Notice: Subject to any disclaimer, the term of this patent is extended or adjusted under 35 U.S.C. 154(b) by 293 days.

(21) Appl. No.: 18/547,336

(22) PCT Filed: Apr. 14, 2022

(86) PCT No.: PCT/AU2022/050339
§ 371 (c)(1),
(2) Date: Aug. 22, 2023

(87) PCT Pub. No.: WO2022/221905
PCT Pub. Date: Oct. 27, 2022

(65) Prior Publication Data
US 2024/0125348 A1      Apr. 18, 2024

(30) Foreign Application Priority Data
Apr. 20, 2021      (AU) ................................. 2021901162

(51) Int. Cl.
*F16C 11/04*          (2006.01)
*G09B 23/38*          (2006.01)

(52) U.S. Cl.
CPC .............. *F16C 11/04* (2013.01); *G09B 23/38* (2013.01); *Y10T 403/32614* (2015.01); *Y10T 403/32844* (2015.01)

(58) Field of Classification Search
CPC ... A47F 8/00; G09B 23/32; Y10T 403/32614; Y10T 403/32819; Y10T 403/32827;
(Continued)

(56) References Cited

U.S. PATENT DOCUMENTS 982,096 A * 1/1911 Schoenhut ............... A63H 3/46
446/381
2,400,032 A * 5/1946 Talbot ....................... A61F 2/64
623/44
(Continued)

FOREIGN PATENT DOCUMENTS

CN          211398257 U      9/2020
GB          2 282 182 A *    3/1995    .............. F16C 11/10
JP          2012173614 A     9/2012

*Primary Examiner* — Michael P Ferguson
(74) *Attorney, Agent, or Firm* — S.J. INTELLECTUAL PROPERTY LTD.

(57) ABSTRACT
An adjustable resistance hinge system for a joint connecting at least a first articulating member and a second articulating member, the hinge system comprising a central element defining a hinge axis. The central element comprises a first and a second elongate arm, each elongate arm extending away from the hinge axis, and a first and a second keeping element hinging on the hinge axis are attached to the first and the second articulating members, respectively. A first and a second biasing device are also engageable with the first and the second elongate arms, respectively. The first and the second elongate arms extend into the first and the second articulating members, respectively, and the first and the second biasing devices engage the central element to resist relative motion of the first and the second articulating members about the hinge axis. The adjustable resistance hinge system allows two joined members to be adjusted to replicate desired physiology, limits, and resistance.

15 Claims, 3 Drawing Sheets

(58) Field of Classification Search
CPC ..... Y10T 403/32844; Y10T 403/32861; F16C
11/045
See application file for complete search history.

(56) References Cited

U.S. PATENT DOCUMENTS

| | | | | |
|---|---|---|---|---|
| 3,187,373 | A * | 6/1965 | Fisher ................. | E05D 11/1007 |
| | | | | 403/92 |
| 4,131,378 | A * | 12/1978 | Daws ........................ | E05D 3/12 |
| | | | | 16/388 |
| 4,619,540 | A | 10/1986 | Day et al. | |
| 4,669,302 | A * | 6/1987 | Wagner ................ | A47C 31/123 |
| | | | | 73/818 |
| 5,180,086 | A * | 1/1993 | Ikeda ........................ | A47F 8/00 |
| | | | | 403/92 |
| 6,267,640 | B1 * | 7/2001 | Akashi ................... | G09B 23/32 |
| | | | | 446/376 |
| 6,478,500 | B1 * | 11/2002 | Farenholtz .............. | F16C 11/10 |
| | | | | 623/59 |
| 2003/0059249 | A1 | 3/2003 | Talaric et al. | |

* cited by examiner 210　245　230　135　240　140　230　255　245　255　135　230　240　250　200

100

215　220　160　165　225　225　160　235　220　205

HINGE SYSTEM WITH ADJUSTABLE RESISTANCE

FIELD OF THE INVENTION

The present invention relates to an adjustable resistance hinge system for a joint. In particular, although not exclusively, the invention relates to an adjustable resistance hinge system for a joint of a human manikin.

BACKGROUND TO THE INVENTION

Numerous types of adjustable hinges are used to connect components while providing resistance control. Typically, a hinge may require adjustment in resistance and/or limitation of its range of movement. An applicable context is in the construction of human manikins, which require anthropometric limbs that closely imitate the movement limitations of a human body. This is particularly relevant when producing human figurines for toys, human crash test dummies for safety testing, or other situations where a manikin is used to simulate the human body's interaction with a product or environmental situation.

For example, the apparatus disclosed by U.S. Pat. No. 4,261,113, titled 'Anthropomorphic dummy for use in vehicle crash testing', defines an anthropomorphic dummy suitable for use in vehicle crash testing. Devices such as these focus on providing a manikin with a skeletal structure wrapped with elastically compressible material to simulate the human body.

Other systems such as U.S. Pat. No. 4,669,302, titled 'Deflection and topography assessment mechanism anthropomorphically natural', defines a manikin used to depress a surface such as a mattress, allowing analysis of a resulting surface contour and pressure distribution over the manikin.

Furthermore, resistance and tension adjustable hinges are commonly provided with screw adjustable features that increase friction within the hinge. These forms of adjustable hinges are limited in terms of precision fine tuning and are also susceptible to increased wear and relaxation of set resistance over time.

There is therefore a need for an improved adjustable resistance hinge system.

OBJECT OF THE INVENTION

It is a preferred object of the invention to provide systems and/or apparatuses and/or methods that address or ameliorate one or more of the aforementioned problems of the prior art and/or provide a useful commercial alternative.

SUMMARY OF THE INVENTION

The present invention relates to an adjustable resistance hinge system for a joint. In one form, although not necessarily the broadest form, the invention resides in an adjustable resistance hinge system for a joint connecting at least a first articulating member and a second articulating member, the hinge system comprising: a central element defining a hinge axis, the central element comprising a first and a second elongate arm, each elongate arm extending away from the hinge axis; a first and a second keeping element hinging on the hinge axis and attached to the first and the second articulating members, respectively; and a first and a second biasing device engageable with the first and the second elongate arms, respectively; wherein the first and the second elongate arms extend into the first and the second articulating members, respectively; and wherein the first and the second biasing devices engage the central element to resist relative motion of the first and the second articulating members about the hinge axis.

Preferably, the adjustable resistance hinge system further comprises a third and a fourth keeping element, wherein the third and the fourth keeping elements extend into, and are attached to, the first and the second articulating members, respectively.

Preferably, any one of the keeping elements comprises an elongate body extending away from the hinge axis.

Further preferably, any one of the keeping elements comprises one or more fixing elements located at a distal end of the elongate body extending away from the hinge axis.

Preferably, the one or more fixing elements are one or more horizontal pins protruding perpendicularly to the elongate body extending away from the hinge axis.

Preferably, the adjustable resistance hinge system further comprises a third and a fourth biasing device; wherein the third and the fourth biasing devices engage the first and the second elongate arms, respectively; and wherein the third and the fourth biasing devices are positioned opposite the first and the second biasing devices, respectively.

Preferably, the first and the second elongate arms each comprise a respective distal end extending away from the hinge axis, and the distal ends each define an engaging surface for each biasing device engaging with each respective elongate member.

Preferably, any one of the biasing devices comprises: a retaining fastener; compression spring; and an engaging spacer.

Further preferably, the compression spring urges the engaging spacer to engage the central element; the retaining fastener captures the compression spring; the retaining fastener is adjustable; and wherein adjusting the retaining fastener adjusts a pre-compression of the compression spring against the spacer engaging the central element.

Further preferably, the retaining fastener is a grub screw.

Preferably, the first and the second articulating members each comprise at least one aperture for inserting and adjusting one of the biasing devices.

Preferably, the keeping elements are spaced apart from the central element.

Preferably, the first and the second articulating members are each formed of two enclosure halves.

Preferably, the first and the second articulating members enclose the hinge system.

Preferably, the first and the second articulating members are members of a human manikin.

Further preferably, the plurality of biasing devices are adjusted to reflect limitations of an articulating human joint.

Further preferably, any one of the first and the second articulating members further comprises a suspension cord configured to suspend the human manikin.

Preferably, the central element further comprises a measurement cord configured to be attached to a measuring device.

Preferably, the second articulating member further comprises a rotation collar, the rotation collar defining a rotation axis perpendicular to the hinge axis.

Preferably, the second articulating member is further connected to a third and a fourth articulating member, the third and fourth articulating members configured to rotate about the rotation axis.

BRIEF DESCRIPTION OF THE DRAWINGS

To assist in understanding the invention and to enable a person skilled in the art to put the invention into practical effect, a preferred embodiment of the invention will be described by way of example only with reference to the accompanying drawings, in which.

DETAILED DESCRIPTION OF THE INVENTION

Figure 1:
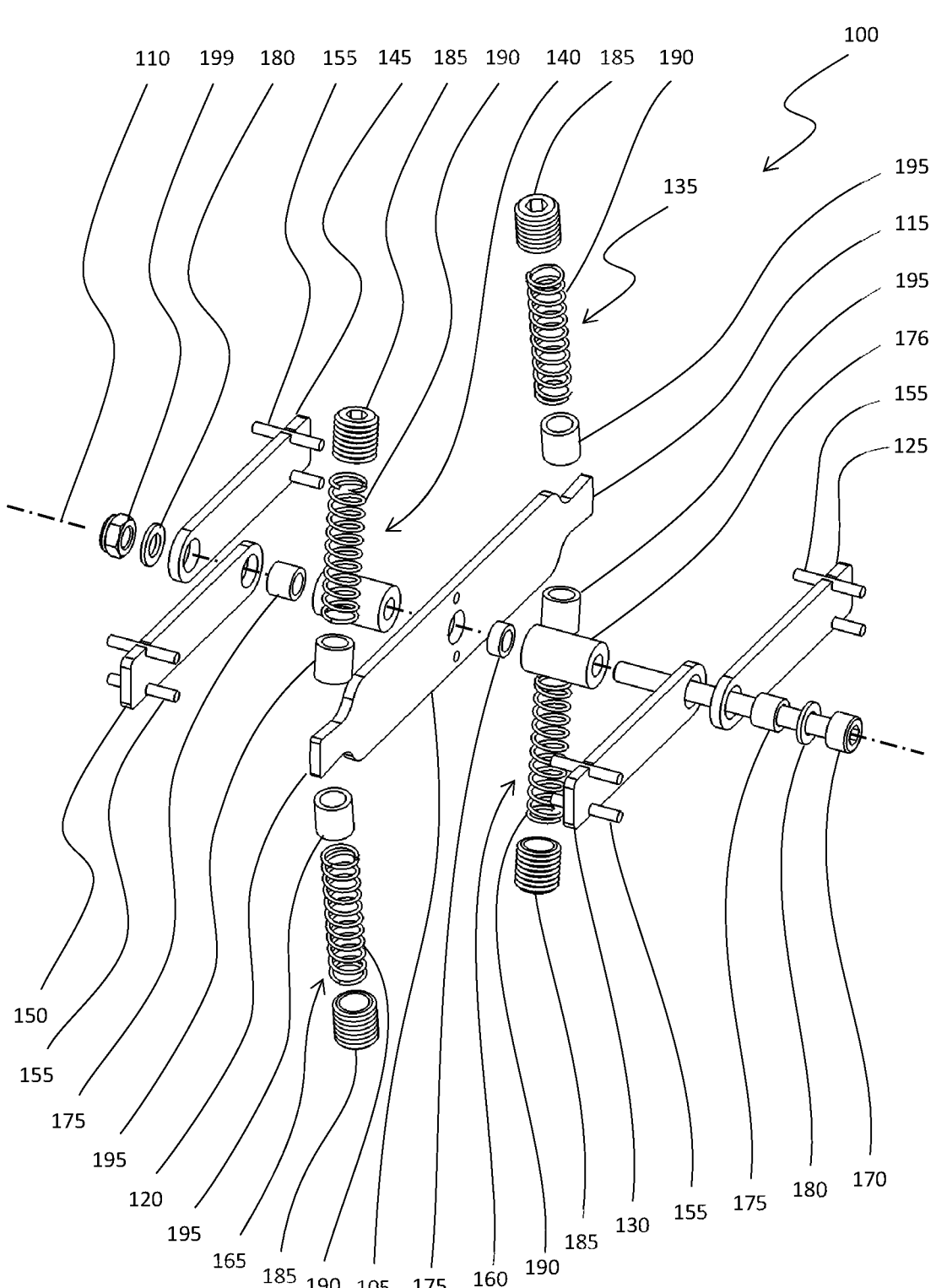
FIG. 1 is an exploded view of an adjustable resistance hinge system for a joint, according to an embodiment of the present invention.

The present invention relates to an adjustable resistance hinge system for a joint connecting at least a first articulating member and a second articulating member. However, it will be appreciated that embodiments of the present invention can apply to other forms of joints connecting separate articulating members. Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

According to one aspect, the present invention is defined as an adjustable resistance hinge system for a joint connecting at least a first articulating member and a second articulating member, the hinge system comprising: a central element defining a hinge axis, the central element comprising a first and a second elongate arm, each elongate arm extending away from the hinge axis; a first and a second keeping element hinging on the hinge axis and attached to the first and the second articulating members, respectively; and a first and a second biasing device engageable with the first and the second elongate arms, respectively; wherein the first and the second elongate arms extend into the first and the second articulating members, respectively; and wherein the first and the second biasing devices engage the central element to resist relative motion of the first and the second articulating members about the hinge axis.

Advantages of some embodiments of the present invention include the ability to provide a variable and adjustable resistance hinge to limit motion and/or provide resistance between two or more articulating members. By providing biasing devices that engage a central arm, the angle and range of motion of the hinge system can be adjusted to replicate in a human manikin angle measurements and mobility limitations of, for example, arms, necks, torsos, hips or legs recorded from human subjects.

The central element rotating on a hinge axis is also free from unnecessary friction, with keeping elements located about the same hinge axis keeping the two or more articulating members connected. As the biasing devices engage elongate arms of the central element, adjustments to the hinge can be made to increase resistance without increasing joint friction.

Those skilled in the art will appreciate that not all of the above advantages are necessarily included in all embodiments of the present invention.

FIG. 1 is an exploded view of an adjustable resistance hinge system 100 for a joint. In one form, although not necessarily the broadest form, the invention resides in the adjustable resistance hinge system 100 for a joint connecting at least a first articulating member and a second articulating member (not shown) of a human manikin. The hinge system 100 comprises a central element 105 defining a hinge axis 110, and the central element 105 comprises a first and a second elongate arm 115, 120, each elongate arm 115, 120 extending away from the hinge axis 110. A first and a second keeping element 125, 130 hinging on the hinge axis 110 is attached to the first and the second articulating members, respectively. Further, a first and a second biasing device 135, 140 is engageable with the first and the second elongate arms 115, 120, respectively, wherein the first and the second elongate arms 115, 120 extend into the first and the second articulating members, respectively. The first and the second biasing devices 135, 140 engage the central element 105 to resist relative motion of the first and the second articulating members about the hinge axis 110.

In a preferred embodiment, the hinge system 100 further comprises a third and a fourth keeping element 145, 150, wherein the third and the fourth keeping elements 145, 150 extend into, and are attached to, the first and the second articulating members, respectively. Further preferably, the four keeping elements 125, 130, 145, 150 each comprise an elongate body extending away from the hinge axis 110. The keeping elements 125, 130, 145, 150 thereby extend away from the hinge axis 110 and are configured to rotate or pivot on the hinge axis 110.

The keeping elements 125, 130, 145, 150 are configured to be fixedly captivated in the first and second articulating members, whereby the first and second articulating members rotate or pivot on the hinge axis 110. Optionally, the keeping elements 125, 130, 145, 150 each comprise one or more fixing elements 155 located at a distal end of the elongate body extending away from the hinge axis 110. Further optionally, the one or more fixing elements 155 may be a pin feature extending perpendicular to the elongate body of the keeping element 125, 130, 145, 150, such that the keeping element 125, 130, 145, 150 is captured by corresponding locating features in the first and the second articulating members. The person skilled in the art will understand that any suitable mechanism or mating feature can be implemented to allow each articulating member to securely capture its respective keeping elements 125, 130, 145, 150.

In a preferred embodiment, the hinge system 100 further comprises a third and a fourth biasing device 160, 165, wherein the third and the fourth biasing devices 160, 165 engage the first and the second elongate arms 115, 120, respectively; and wherein the third and the fourth biasing devices 160, 165 are positioned opposite the first and the second biasing devices 135, 140, respectively. The biasing devices 135, 140, 160, 165 engage the elongate arms 115, 120 and restricts the movement of the central element 105, providing resistance by pushing on each end of the elongate arms 115, 120 when the joint is bent and experiences flexion or extension. Further preferably, the first and the second elongate arms 115, 120 each comprise a respective distal end extending away from the hinge axis 110, and the distal ends each define an engaging surface for each biasing device 135, 140, 160, 165 engaging with each respective elongate member 115, 120.

In a preferred embodiment, the central element 105 and keeping elements 125, 130, 145, 150 pivot on the hinge axis 110 defined by a keeping screw 170. Optionally, the central element 105 and keeping elements 125, 130, 145, 150 interface with the keeping screw 170 via sheath tubes 175, and are offset along the axis 110 by washers 180 and offset spacers 176. The sheath tubes 175 fit around the keeping screw 170, and within apertures on the central element 105 and keeping elements 125, 130, 145, 150. The central element 105 and keeping elements 125, 130, 145, 150 are able to freely rotate on the sheath tubes 175 over the keeping screw 170.

Preferably, the keeping elements 125, 130, 145, 150 are spaced apart from the central element 105 via the offset spacers 175 which have a diameter that is larger than the sheath tubes 175. The person skilled in the art will understand that alternative means of mechanical fastening may be employed to keep the central element 105 and keeping elements 125, 130, 145, 150 appropriately aligned and spaced along the hinge axis 110. The use of washers, bearings, and sheathes also assist in reduction of undesired friction. Preferably, the hinge system 100 is pre-assembled to be inserted as a joint between two articulating members. Each washer 180, sheath tube 175, offset spacer 176, keeping element 125, 130, 145, 150 and the central element 105 can be stacked onto the keeping screw 170, with the sheath tubes 175 acting as bearings for the keeping elements 125, 130, 145, 150 and the central element 105, and the offset spacers 176 providing consistent offset distance of components along the hinge axis 110. The assembly of the hinge system 100 may be completed by a nut 199 that clamps all of the washers 180, sheath tubes 175, and offset spacers 176 together tightly, with the keeper elements 125, 130, 145, 150 and central element 105 freely rotatable.

In a preferred embodiment, any one of the biasing devices 135, 140, 160, 165 comprises a retaining fastener 185, a compression spring 190, and an engaging spacer 195. Further preferably, the compression spring 190 urges the engaging spacer 195 to engage the central element 120, the retaining fastener 185 captures the compression spring 190, and the retaining fastener 185 is adjustable. Adjustments made to the retaining fastener 185 adjusts and loads a pre-compression of the compression spring 190 against the spacer 195 engaging the central element 120. Preferably, when the assembly of the hinge system 100 is enclosed within the articulating members, the engaging spacers 185 rest against the elongate members 115, 120 of the central element 105. When the joint is flexed or extended, the central element 105 rocks on the hinge axis 110, and the elongate members 115, 120 push against the engaging spacers 185 to compress the compression springs 190 held in place by the retaining fasteners 185.

Figure 2:
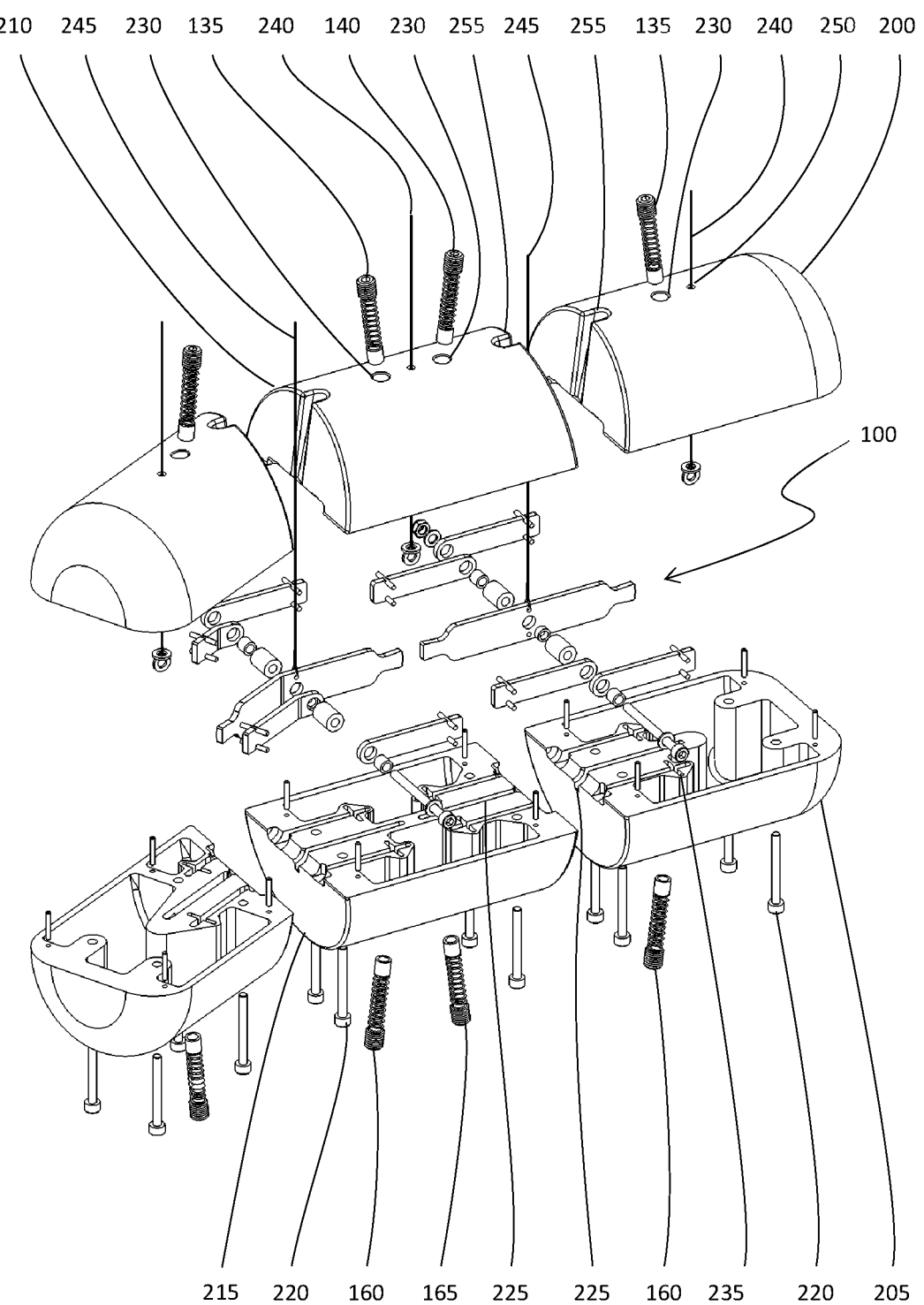
FIG. 2 is an exploded view of three members joined by the adjustable resistance hinge system of FIG. 1.

FIG. 2 is an exploded view of three members, such as human manikin elements representing sections of a human torso, joined by the adjustable resistance hinge system 100 of FIG. 1. FIG. 2 illustrates a first articulating member and a second articulating member connected by an adjustable resistance hinge system 100. In addition, a third angled articulating member is also illustrated as an example of a chain of articulating members, connected by hinge systems 100.

In a preferred embodiment, the articulating members each comprise two enclosure halves. A first articulating member top enclosure 200 and a first articulating member bottom enclosure 205, along with a second articulating member top enclosure 210 and a second articulating member bottom enclosure 215, enclose the hinge system 100. The enclosures 200, 205, 210, 215 capture the hinge system 100 and are held together via fasteners 220, which optionally are machine screws. The enclosures 200, 205, 210, 215 may be solid material with receiving features and cut outs shaped to receive the hinge system 100, as well as receiving features for any components intended to manipulate characteristics of the articulating members, including components to increase the weight of the articulating members.

In a preferred embodiment, the enclosures 200, 205, 210, 215 define a central element receiving feature 225 which receives the central element 105. When the central element 105 is in the form of a flat bar, the central element receiving feature 225 may take the form of a slotted cavity, allowing the central element 105 to rock and pivot on the hinge axis 110, freely moving within, and between, the two articulating members. As previously mentioned, the movement of the central element 105 is resisted by the biasing devices 135, 140, 160, 165 engaging with each respective elongate member 115, 120.

Preferably, each enclosure 200, 205, 210, 215 comprises at least one aperture 230 configured to receive a biasing device 135, 140, 160, 165, externally inserted into the apertures 230. The aperture 230 is sized to receive the biasing devices 135, 140, 160, 165, and comprises an internal thread to engage and receive the retaining fastener 185 of the biasing device 135, 140, 160, 165. Consistent sizing of the compression spring 165 allows for springs of different strengths to be fitted in the same apertures 230, allowing free movement and compression of the spring, with further fine tuning achieved by advancing or retreating the retaining fastener 185. Pre-load compression and resistance strength of a captured spring 190 can also be altered by employing spacers 195 of different heights. The person skilled in the art will also understand that similar overall dimensions of the compression spring 165 can be maintained, while providing different compression strengths by altering wire diameter and/or coil pitch.

As illustrated in FIG. 2, the enclosures 200, 205, 210, 215 comprise further features which facilitate attachment of the hinge system 100 to each articulating member. By way of example, cross channels 235 are sized to receive fixing elements 155. Subsequent articulating members can also be attached using further hinge systems 100, which can optionally be angled in different directions. The person skilled in the art will understand that the shape of articulating members may be determined by the intended use of the hinge, or by the anatomical structure of a human manikin.

In a preferred embodiment, the articulating members are members of a human manikin. Accordingly, the plurality of biasing devices 135, 140, 160, 165 may be adjusted to reflect limitations of an articulating human joint. These limitations may be set to imitate the flexion and extension of a human joint, limited by ligament, muscle, or skeletal structure. Further preferably, the human manikin may be attached to a measurement device or a frame that supports the human manikin. The articulating members may therefore further comprise a suspension cord 240 configured to suspend or otherwise support the human manikin. Measurement data of the human manikin may also be gathered, by determining changes in position or location of joint locations represented by the hinge axis 110 of each hinge device 100. The central element may therefore further comprise a measurement cord 245 configured to be attached to a measuring device. The articulating members may optionally further comprise recesses, through holes 250, or cut-outs 255 to accommodate the suspension cords 240 and/or the measurement cords 245. Optionally, the measurement cords 245 are string potentiometers.

Figure 3:
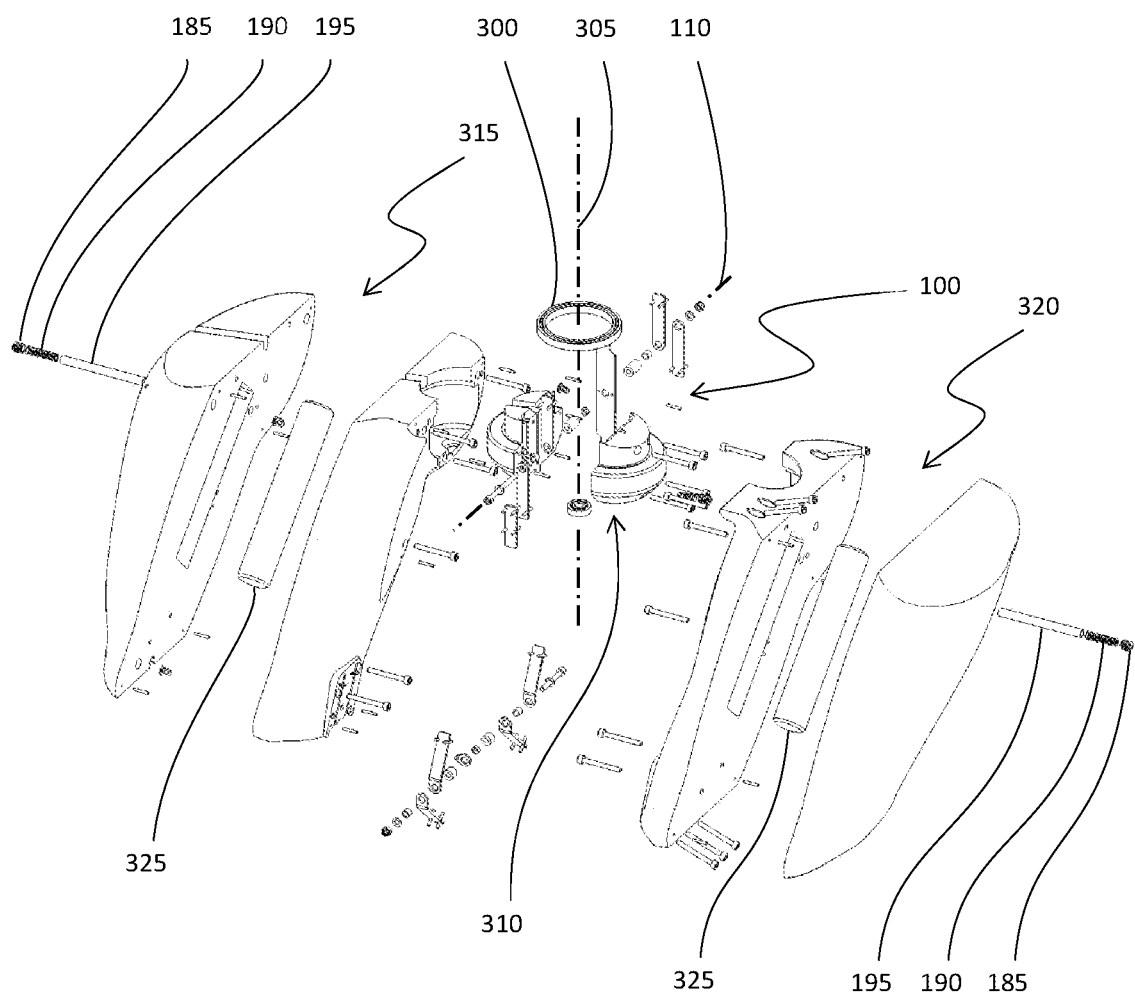
FIG. 3 is an exploded view of a manikin hip joint joined by a further embodiment of an adjustable resistance hinge system for a joint, according to another embodiment of the present invention.

FIG. 3 is an exploded view of a manikin hip joint joined by a further embodiment of the adjustable resistance hinge system 100 for a joint. While arms, legs, and the spine of a manikin may be a linear chain of consecutive articulating members, a hip joint typically requires hinging motion as well as rotational motion. In a preferred embodiment, a second articulating member 310 further comprises a rotation collar 300, the rotation collar defining a rotation axis 305 perpendicular to the hinge axis 110. The second articulating member 310 may also be shaped as a circular body to be further connected to, and receive, a third and a fourth articulating member 315, 320. The third and fourth articulating members 315, 320 may be shaped to represent thighs of the manikin, configured to rotate about the rotation axis 305 of the second articulating member 310 formed as a circular central assembly.

The manikin hip joint can therefore utilize the hinge system 100 to provide an adjustable hinge that rotates on the rotation axis 305 and hinges laterally. The first articulating member (not shown) would represent the lower torso of a manikin. This allows a manikin to replicate the complex combination of motions found in the hips and lower spine of a human. The resistance of both hinging motion and rotation motion of the joint are adjustable using the same biasing devices 135, 140, 160, 165 to provide resistance adjustable action. In a similar fashion, the rotational resistance can be adjusted through biasing devices 135, 140, 160, 165 externally inserted into apertures 230 found on the left and right thighs represented by the third and fourth articulating members 315, 320. Thicker articulating members, such as those representing the thighs of a manikin, may use longer engagement spacers 195 to cover additional distance and space. These biasing devices 135, 140, 160, 165 can similarly be adjusted to provide an addition or reduction of tension on the central element 105, or other engaging surfaces on the second articulating member 310.

As mentioned, the enclosures of the articulating members may be solid material with receiving features and cut outs configured to receive the hinge system 100, as well as receiving features for any components intended to manipulate characteristics of the articulating members, such as weights 325.

The hinge system 100 therefore addresses at least some of the aforementioned problems of the prior art, providing an adjustable resistance hinge system 100 that allows two joined members to be adjusted to replicate human physiology, allowing accurate assessment of joints and specific skeletal and spinal angles. By providing a hinge system that does not increase resistance through the application of friction, the hinge allows fine movements of the human manikin, especially when the manikin settles over time in testing environments comprising soft surfaces, such as a mattress of a bed. The hinge system 100 therefore provides a useful commercial alternative to the state of the art, offering a non-friction, adjustable variable resistance hinge.

In this patent specification, adjectives such as first and second, left and right, top and bottom, up and down, upper and lower, rear, front and side, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

The above description of various embodiments of the present invention is provided for purposes of description to one of ordinary skill in the related art. It is not intended to be exhaustive or to limit the invention to a single disclosed embodiment. Numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the scope of the above described invention, which is determined by the following claims.

The invention claimed is:

1. An adjustable resistance hinge system of a joint connecting at least a first articulating member and a second articulating member, the first and the second articulating members comprising adjacent arm, neck, torso, hip or leg members of a human manikin, the hinge system comprising:
   a central element comprising an elongate body having a centrally-disposed aperture pivotably receiving a pivot fastener therethrough defining a hinge axis about which the first articulating member is rotatable relative to the second articulating member, the central element comprising a first and a second elongate arm at opposing longitudinal ends thereof, each elongate arm extending away from the hinge axis and received within a respective one of the first and second articulating members;
   a pair of first and second keeping elements spaced apart from the central element along the hinge axis, each keeping element comprising an elongate body extending away from the hinge axis and received within a respective one of the first and second articulating members, each keeping element having an aperture disposed at a proximal end thereof pivotably receiving the pivot fastener therethrough, and one or more fixing elements located at a distal end of the elongate body and configured to be attached to one of the first and the second articulating members, respectively; and
   a first and a second biasing device, positioned in the first and second articulating members, respectively, and engageable with the first and the second elongate arms, respectively, each biasing device engaging with a respective one of the first and second articulating members and an engaging surface of a distal end of a respective one of the first and second elongate arms;
   wherein the first and the second biasing devices engage the central element to resist rotation of the central element within the first and second articulating members and relative motion of the first and the second articulating members about the hinge axis.

2. The hinge system of claim 1, further comprising a pair of third and fourth keeping elements spaced apart from the central element along the hinge axis, wherein the third and the fourth keeping elements extend into, and are attached to, the first and the second articulating members, respectively.

3. The hinge system of claim 2, wherein the one or more fixing elements are one or more horizontal pins protruding perpendicularly to the elongate body and extending away from the hinge axis.

4. The hinge system of claim 1, further comprising a third and a fourth biasing device;
   wherein the third and the fourth biasing devices engage the first and the second elongate arms, respectively; and
   wherein the third and the fourth biasing devices are positioned opposite the first and the second biasing devices, respectively.

5. The hinge system of claim 1, wherein any one of the biasing devices comprises:
   a retaining fastener adjustably engaging a respective one of the first and second articulating members;
   a compression spring; and an engaging spacer engaging a respective one of the first and second elongate arms.

6. The hinge system of claim 5, wherein:

the compression spring urges the engaging spacer to engage the central element;

the retaining fastener captures the compression spring;

the retaining fastener is adjustable; and wherein adjusting the retaining fastener adjusts a pre-compression of the compression spring against the spacer engaging the central element.

7. The hinge system of claim 6, wherein the retaining fastener is a grub screw.

8. The hinge system of claim 1, wherein the first and the second articulating members each comprise at least one aperture for inserting and adjusting one of the biasing devices.

9. The hinge system of claim 1, wherein the first and the second articulating members are each formed of two enclosure halves.

10. The hinge system of claim 1, wherein the first and the second articulating members enclose the hinge system.

11. The hinge system of claim 1, wherein the plurality of biasing devices can be adjusted to reflect limitations of an articulating human joint.

12. The hinge system of claim 1, wherein any one of the first and the second articulating members further comprises a suspension cord configured to suspend the human manikin.

13. The hinge system of claim 1, wherein the central element further comprises a measurement cord configured to be attached to a measuring device.

14. The hinge system of claim 1, wherein the second articulating member further comprises a rotation collar, the rotation collar defining a rotation axis perpendicular to the hinge axis.

15. The hinge system of claim 14, wherein the second articulating member is further connected to a pair of third and fourth articulating members rotatably coupled to the rotation collar, the third and fourth articulating members configured to rotate about the rotation axis.

\* \* \* \* \*